3,313,801
PROCESS FOR INHIBITING N-ALKYLATION OF PYRROLIDINES AND SUBSTITUTED PYRROLIDINES BY MICROORGANISMS, AND PRODUCTS PRODUCED THEREBY
Alexander D. Argoudelis, Kalamazoo, Le Roy E. Johnson, Kalamazoo Township, Kalamazoo County, and Thomas R. Pyke, Prairie Ronde Township, Kalamazoo County, Mich., assignors to The Upjohn Company, Kalamazoo, Mich., a corporation of Delaware
No Drawing. Filed Oct. 18, 1965, Ser. No. 497,438
10 Claims. (Cl. 260—210)

This invention relates to a novel process for inhibiting the formation of N-alkylated pyrrolidines and substituted pyrrolidines by microorganisms during a fermentation and to novel compounds produced thereby. More particularly, this invention relates to a novel process wherein a metabolic inhibitor, selected from the class consisting of water-soluble sulfonamides possessing antibacterial properties, and carbonyl reagents which inhibit glutamic acid decarboxylases, is added to a microbiological fermentation to inhibit the formation of N-alkylated pyrrolidines and substituted pyrrolidines, and to novel compounds produced thereby.

Illustrative of the metabolic inhibitors which can be used in the novel process are the following compounds and their salts: sulfanilamide, sulfaguanidine, sulfathiazole, sulfadiazine, N-sulfanilbenzamide, sulfaquinoxoline, sulfabromomethazine, N'-acetylsulfanilamide, sulfadimethoxine, sulfamerazine, sulfamethazine, sulfapyrazine, sulfapyridine, thiocarbohydrazide, semicarbazide, thiosemicarbazide, furoic acid hydrazide, isonicotinic acid hydrazide, and hydroxyl amine.

The process of the subject invention can be used in a fermentation using the microorganism *Streptomyces lincolnensis* var. *lincolnensis* which is described in U.S. Patent 3,086,912 as a producer of the antibiotic lincomycin. When a metabolic inhibitor of the subject process is added to the process described in Example 1 of U.S. Patent 3,086,912, the antibiotic lincomycin D is produced. Lincomycin D is N-demethyllincomycin and can be represented by the following structural formula:

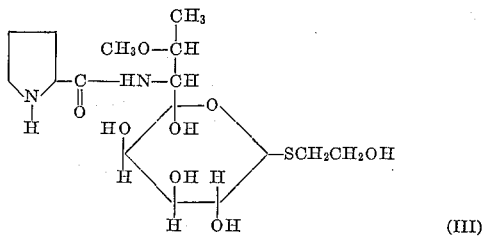

The process of the subject invention can also be used in the celesticetin fermentation disclosed in Example 3 of U.S. Patent 2,928,844. The resulting product is the novel compound N-demethylcelesticetin which can be represented by the following structural formula:

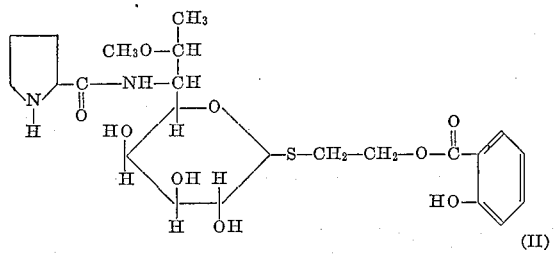

N-demethylcelesticetin can be hydrolyzed according to the process disclosed in U.S. Patent 2,851,463 to produce the novel compound N-demethyldesalicetin which can be represented by the following structural formula:

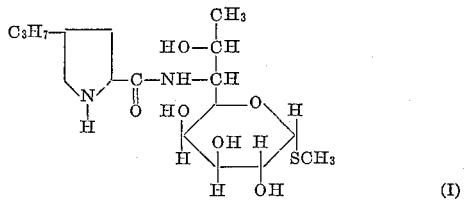

The novel process of this invention is practiced by incorporating in a fermentation medium an effective amount of a metabolic inhibitor, ranging from more than incidental impurities of 0.01 g./liter up to 8 g./liter of fermentation medium. The metabolic inhibitor can be in the medium initially, or it can be fed to the culture during the fermentation. The feeding can be done continuously, semi-continuously or by other means as long as the concentration of the metabolic inhibitor in the fermentation medium does not affect the growth of the microorganism to the point where the production of the desired product suffers. Preferably, the feeding is commenced when the fermentation is 24 to 48 hours old. The toxic level of the metabolic inhibitor will vary with the microorganism, equipment, and media used, but in general a level at any particular time during the fermentation less than about 5 g./liter of fermentation medium is not toxic. Therefore, a feeding schedule for the metabolic inhibitor can be used whereby the level of the metabolic inhibitor in a fermentation is never greater than 5 g./liter at any particular time. As this level is increased, and again depending on equipment and media used, some toxicity manifestations, such as reduced mycelial growth, may be observed. When the mycelial growth is significantly depressed by the additions of the metabolic inhibitor, then, ordinarily, a noticeable drop in the fermentation yield of the desired product will be observed.

When a metabolic inhibitor, as previously defined, is added to a lincomycin fermentation such as disclosed in U.S. Patent 3,086,912, lincomycin D and some lincomycin are produced. Also, on the addition of a metabolic inhibitor to a celesticetin fermentation, as disclosed above, N-demethylcelesticetin and some celesticetin are produced. A preferred method for the recovery of lincomycin D and N-demethylcelesticetin is by the use of a liquid cation exchanger. The first step of said process comprises contacting the beer with a water-immiscible liquid cation exchanger comprising at least one water-immiscible organic diluent and at least one oil-soluble salt of an aromatic sulfonic acid, said acid having 1 to 2 aromatic rings and at least 1 alkyl moiety, there being in total at least 15 alkyl carbon atoms when the acid contains 1 aromatic ring and at least 8 alkyl carbon atoms when the acid contains 2 aromatic rings. The second step of said process comprises contacting the eluted liquid cation exchanger resulting from the first step with a mixture of water and at least one stripping agent selected from the group consisting of amines, water-soluble acid addition salts thereof, and water-soluble quaternary ammonium salts, at a pH less than about 7. The resulting aqueous solution can then be used directly as a convenient source of the nitrogen-basic material, or the nitrogen-basic material can be separated from the aqueous solution in free base form or as an acid-addition salt by methods known in the art.

As mentioned above, the water-immiscible liquid cation exchanger of the novel process of this invention comprises at least one water-immiscible organic diluent and at least one oil-soluble salt of an aromatic sulfonic acid.

A water-immiscible diluent is one which forms a two-phase liquid system in contact with an equal volume of water. Examples of suitable water-immiscible organic diluents are the alkanes, e.g., pentane, hexane, heptane, octane, and the like, especially the commercially available mixtures of isomeric hexanes and heptanes; cycloalkanes, e.g., cyclohexane, methylcyclohexane, and the like; aromatic hydrocarbon, e.g., benzene, toluene, the xylenes, the trimethylbenzenes, ethylbenzene, cymene, cumene, tetrahydronaphthalene, and the like, halogenated hydrocarbons, e.g., dichloromethane, chloroform, carbon tetrachloride, 1,2-dichloroethane, 1,1,2,2-tetrachloroethane, chlorobenzene, dichlorobenzenes, and the like; ethers, e.g., diethyl ether, diisopropyl ether, and the like; esters, e.g., ethyl acetate, butyl acetate, methyl benzoate, and the like; and nitro compounds, e.g., nitromethane, nitrobenzene, and the like. Dichloromethane is especially preferred as an organic diluent. The cation portion of the oil-soluble sulfonic acid salt can be any of a large variety of metal cations. Alkali metal cations, e.g., sodium, potassium and ammonium ions, and alkaline earth metal cations, e.g., magnesium, calcium, and barium ions, are preferred, but other metal cations, e.g., aluminum, zinc, and copper ions, are also suitable. The anion portion of the oil-soluble sulfonic acid salt can correspond to any of a large variety of aromatic sulfonic acids or mixtures thereof. Preferred sulfonic acids are those obtained by sulfonation of mono- or polyalkylbenzenes or naphthalenes. Such sulfonic acids and their oil-soluble salts are well known to those skilled in the art and many are readily available from commercial sources. Further procedures are necessary to effect a separation of lincomycin and lincomycin D in a lincomycin fermentation and celesticetin and N-demethylcelesticetin in a celesticetin fermentation. This can be done, conveniently, by repeated extractions at an alkaline pH of a solution containing one of the two pairs of antibiotics. A solvent for lincomycin and celesticetin, for example, a chlorinated lower-alkane, such as methylene chloride can be used. These solvent extracts contain predominantly lincomycin or celesticetin. The remaining aqueous solution, which contains predominantly either lincomycin D with traces of lincomycin or N-demethylcelesticetin with traces of celesticetin, advantageously, can be extracted repeatedly with a solvent for lincomycin D and N-demethylcelesticetin, for example, a water-immiscible lower alkanol, such as n-butyl alcohol. The solvent extracts can be subjected to further purification procedures, for example, counter current distribution, partition chromatography on silica or diatomaceous earth, advantageously, using solvents for lincomycin D and N-demethylcelesticetin, as disclosed above, and water mixtures as the eluting agents, adsorption chromatography on suitable adsorbents, for example, Florisil (a synthetic silicate of the type described in U.S. Patent 2,393,625 and sold by the Floridin Company), alumina, and carbon with elution of the lincomycin D or N-demethylcelesticetin therefrom, advantageously, with solvents for lincomycin D and N-demethylcelesticetin, as mentioned above.

Fractional liquid-liquid extraction is accomplished in partition chromatographic columns or in a counter current distribution apparatus using solvent systems such as n-butyl alcohol and water (1:1).

Crystallization of lincomycin D or N-demethylcelesticetin can be accomplished, conveniently, by dissolving a purified salt preparation of either compound in water and adding a lower alkanone, for example, acetone.

Recrystallization is accomplished by dissolving the crystalline salt in water, adding a water-miscible solvent, e.g., acetone, methanol, ethanol, or 2-propanol, and cooling to induce or complete crystallization. The crystals are filtered and washed with aqueous solvents, and, if desired, by anhydrous solvent and then vacuum dried.

The new compounds of the invention can also be recovered from filtered fermentation beer by adsorption on cation exchange resins. Both the carboxylic and sulfonic acid types can be used. [Suitable carboxylic acid resins include the polyacrylic acid resins obtained by the copolymerization of acrylic acid and divinylbenzene by the procedure given on page 87 of Kunin, Ion Exchange Resins, 2nd ed. (1958), John Wiley and Sons, Inc. Carboxylic acid cation exchange resins of this type are marketed under the trade names Amberlite IRC–50 and Zeokarb 226. Suitable sulfonic acid resins include nuclear sulfonated polystyrene resins cross-linked with divinylbenzene which are obtained by the procedure given on page 84 of Kunin, supra. Sulfonated cation exchange resins of this type are marketed under the trade names Dowex 50, Amberlite IR–120, Nalcite HCR, Chempro C–20, Permutit Q, and Zeokarb 225.]

The antibiotic is eluted from the resin with an acid, advantageously at a pH lower than the pKa of the cation exchange resin used. Satisfactory results are obtained with a pH of about 1 to 6. The eluate is adjusted to about pH 7.5 to 8.5 with a base, e.g., sodium hydroxide, or a strongly basic anion exchange resin. [Suitable anion exchange resins for this purpose are obtained by chloromethylating by the procedure given on pages 88 and 97 of Kunin, supra, polystyrene cross-linked, if desired, with divinylbenzene, prepared by the procedure given on page 84 of Kunin, supra, and quaternizing with trimethylamine or dimethylethanolamine by the procedure given on page 97 of Kunin, supra. Anion exchange resins of this type are marketed under the trade names Dowex 2, Dowex 20, Amberlite IRA–400, Duolite A–102, and Permutit S–1.]

The novel compounds of the invention can be purified by successive transfers from protonated to non-protonated forms and vice versa, especially with other types of treatments intervening, as for example, solvent extractions and washings, chromatography and fractional liquid-liquid extractions. In this manner salts of lincomycin D and N-demethylcelesticetin can be employed to isolate or upgrade the respective antibiotic. For example, the antibiotic can be converted to an insoluble salt, such as the picrate, which can be subjected to purification procedures and then used to regenerate the antibiotic free base by treatment with alkali. Or the antibiotic can be converted to a water-soluble salt, such as the hydrochloride or sulfate, and the aqueous solution of the salt extracted with various water-immiscible solvents before regenerating the antibiotic free base by treatment with alkali of the thus-extracted acid solution.

Salts of lincomycin D, N-demethylcelesticetin, and N-demethyldesalicetin can be used for the same biological purposes as the free base. Salts of lincomycin D and N-demethylcelesticetin can be used to upgrade the antibiotic as previously described.

Specific acid salts of the novel compounds of this invention can be made by neutralizing the free base with an appropriate acid to below about pH 7.0, and advantageously to about pH 2 to pH 6. Suitable acids for this purpose include hydrochloride, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic, cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, dimethyldithiocarbamic, sorbic, monochloroacetic, undecylenic, 4'-hydroxyazobenzene-4-sulfonic, octadecylsulfuric, picric, benzoic, cinnamic, and like acids.

Lincomycin D can be used in hospital laboratories to isolate *Klebsiella pneumoniae* from swabs or body exudates of patients in which mixed populations of certain other organisms, such as *Bacillus subtilis* and *Staphylococcus aureus* are present. The latter organisms are relatively susceptible to lincomycin D, whereas *K. pneumoniae* is relatively resistant, and when an appropriate concentration of lincomycin D is present in the medium, *K. pneumoniae* will grow where *B. subtilis* or *S. aureus* will not. The new compound can also be used to inhibit gram-positive, sporeformer spreaders on agar plates when isolating molds, yeasts, actinomycetes, and gram-negative organisms. It can be used, for example, in the isolation of microorganisms in soil samples as well as in the isolation of gram-negative organisms, for example, *Pseudomonas, Proteus,* and *Escherichia coli* from mixed infections in the presence of staphylococci or streptococci.

N-demethylcelesticetin and N-demethyldesalicetin can be used to make β-hydroxyethylthiocelestosaminide (β-HTC) by substituting for celesticetin and desalicetin in Examples 1 and 2, respectively, of U.S. Patent 3,208,996. N-demethylcelesticetin and N-demethyldesalicetin can also be used to make antibacterially active analogues of celesticetin and desalicetin which analogues have antibacterial spectrums differing from celesticetin and desalicetin. For example, by ethylating N-demethylcelesticetin and N-demethyldesalicetin, there are obtained compounds which are active against gram-negative bacteria.

The following examples are illustrative of the process and products of the present invention, but are not to be construed as limiting. All percentages are by weight and all solvent mixture proportions are by volume unless otherwise noted.

EXAMPLE 1

A. *Fermentation of lincomycin D*

A soil slant of *Streptomyces lincolnensis* var. *lincolnensis*, NRRL 2936, was used to inoculate a series of 500-ml. Erlenmeyer flasks, each containing 100 ml. of sterile seed medium consisting of the following ingredients:

| | |
|---|---|
| Glucose monohydrate | g__ 25 |
| Pharmamedia * | g__ 25 |
| Tap water q.s. | l__ 1 |

* Pharmamedia is an industrial grade of cottonseed flour produced by Trader's Oil Mill Company, Fort Worth, Texas. The presterilization pH was 7.2. The seed was grown for three days at 28° C. on a Gump rotary shaker operating at 250 r.p.m. with a 2½ inch stroke.

A 5% inoculum of the seed described above (5.0 ml.) was used to inoculate a 500-ml. Erlenmeyer flask containing 100 ml. of sterile fermentation medium consisting of the following ingredients:

| | |
|---|---|
| Glucose monohydrate | g__ 15 |
| Starch | g__ 40 |
| Molasses | g__ 20 |
| Pharmamedia | g__ 25 |
| CACO$_3$ | g__ 8 |
| Tap water q.s. | l__ 1 |

The post-sterilization pH was 6.8. The fermentation flask was incubated at a temperature of 28° C. on a Gump rotary shaker operating at 250 r.p.m. with a 2½ inch stroke. After 24 hours of fermentation, 5 mg. of sulfanilamide was added per ml. of medium (0.5 g. per 100 ml. of medium). The fermentation beer was harvested after 96 hours of fermentation time.

B. *Recovery*

Whole beer from a series of lincomycin D fermentations, as described above, was filtered with the aid of diatomaceous earth. The filter cake was washed with water and the wash was combined with the filtrate. The combined clear beer and wash (4 liters) was adjusted to pH 6.0 and extracted once with 400 ml. of a 9% solution of sodium dinonyl naphthalene sulfonate (NaDNNS) and Skellysolve B (isomeric hexanes). The spent beer was then extracted once with 400 ml. of Skellysolve B. The NaDNNS and the Skellysolve B extracts were combined. The combined extract was washed with 200 ml. of water. The aqueous wash was discarded and the NaDNNS-Skellysolve B phase was mixed with 160 ml. of a 25% solution of Aliquat–336 (industrial grade tricaproyl methyl ammonium chloride produced by General Mills, Chemical Division, Kankakee, Illinois) in Skellysolve B and 200 ml. of water. The mixture was shaken well and then the two phases were allowed to separate. The aqueous phase was kept for further processing. The organic phase was extracted twice with 200 ml. of water each time. These aqueous extracts were combined with the first aqueous extract and this combined aqueous solution was washed twice with 200 ml. of Skellysolve B each time. The Skellysolve B wash was discarded. The combined aqueous solution was adjusted to pH 10 and extracted three times with 350-ml. portions of methylene chloride each time. The methylene chloride extract was concentrated to dryness to give a preparation which was found by paper chromatography to contain lincomycin compounds, but not lincomycin D. The spent aqueous solution was then extracted with n-butanol (four 350-ml. portions). The butanol extracts were combined and concentrated to dryness. The residue was triturated with 95% ethanol and 140 mg. of insoluble crystalline material was isolated by filtration. This preparation was found by paper chromatography to contain mainly lincomycin D with small amounts of related lincomycin compounds. Recrystallization of this preparation by dissolving in 4 ml. of water and adding 25 ml. of acetone, afforded 50 mg. of a crystalline preparation consisting of lincomycin D only having the following elemental analysis:

Calcd. for $C_{17}H_{32}N_2O_6S \cdot HCl \cdot H_2O$: C, 45.73; H, 7.90; N, 6.28; S, 7.18; Cl, 7.94; O, 25.08. Found: C, 45.62; H, 7.78; N, 6.23; S, 7.31; Cl, 7.82; O, 25.24 (by diff.).

EXAMPLE 2

The following metabolic inhibitors can be substituted for sulfanilamide in Example 1 to produce lincomycin D: sulfaguanidine, sulfathiazole, sulfadiazine, N-sulfanilylbenzamide, sulfaquinoxoline, sulfabromomethazine, N'-acetylsulfanilamide, sulfadimethoxine, sulfamerazine, sulfamethazine, sulfapyrazine, sulfapyridine, thiocarbohydrazide, semicarbazide, thiosemicarbazide, furoic acid hydrazide, isonicotinic acid hydrazide, and hydroxylamine.

EXAMPLE 3

*N-demethylcelesticetin*

By adding a metabolic inhibitor of Examples 1 and 2 to the fermentation of Example 3 of U.S. Patent 2,928,844 in the manner disclosed in Example 1 above, there is produced N-demethylcelesticetin which can be recovered from the fermentation broth in the manner disclosed in Example 1 to give crystalline N-demethylcelesticetin having the following elemental analysis:

Calcd. for $C_{23}H_{34}N_2O_9S$: C, 53.64; H, 6.65; N, 5.44; O, 27.96; S, 6.23.

EXAMPLE 4

*N-demethyldesalicetin*

By substituting N-demethylcelesticetin, as obtained in Example 3, for celesticetin in Example 1 of U.S. Patent 2,851,463 there is obtained N-demethyldesalicetin.

We claim:
1. A process for inhibiting the formation of N-alkylated pyrrolidines and substituted pyrrolidines by microorganisms during a fermentation which comprises incorporating into the fermentation medium a metabolic inhibitor selected from the class consisting of water-soluble sulfonamides possessing antibacterial properties, and carbonyl reagents which inhibit glutamic acid decarboxylases, in an effective amount ranging from more than incidental impurities up to 8 g./liter of aqueous nutrient medium.

2. A process for inhibiting the formation of N-alkylated compounds selected from the group consisting of lincomycin and celesticetin by microorganisms during a fermentation which comprises incorporating into the fermentation medium a metabolic inhibitor selected from the class consisting of water-soluble sulfonamides possessing antibacterial properties, and carbonyl reagents which inhibit glutamic acid decarboxylases, in an effective amount ranging from more than incidental impurities up to 8 g./liter of aqueous nutrient medium.

3. A process which comprises cultivating *Streptomyces lincolnensis* var. *lincolnensis* under aerobic conditions in an aqueous nutrient medium containing a metabolic inhibitor selected from the class consisting of water-soluble sulfonamides possessing antibacterial properties, and carbonyl reagents which inhibit glutamic acid decarboxylases, in an effective amount ranging from more than incidental impurities up to 8 g./liter of aqueous nutrient medium, until substantial activity is imparted to said medium by production of lincomycin D, and isolating the lincomycin D so produced.

4. A process according to claim 3 wherein the metabolic inhibitor is sulfanilamide.

5. A process which comprises cultivating *Streptomyces lincolnensis* var. *lincolnensis* under aerobic conditions in an aqueous nutrient medium to which 5 mg. of sulfanilamide per ml. of medium is fed, after 24 hours of fermentation time, until substantial activity is imparted to said medium by production of lincomycin D, and isolating the lincomycin D so produced.

6. A process which comprises cultivating *Streptomyces caelestis* under aerobic conditions in an aqueous nutrient medium containing a metabolic inhibitor selected from the class consisting of water-soluble sulfonamides possessing antibacterial properties, and carbonyl reagents which inhibit glutamic acid decarboxylases, in an effective amount ranging from more than incidental impurities up to 8 g./liter of aqueous nutrient medium, until substantial activity is imparted to said medium by production of N-demethylcelesticetin, and isolating the N-demethylcelesticetin so produced.

7. A process for producing N-demethyldesalicetin which comprises (1) cultivating *Streptomyces caelestis* under aerobic conditions in an aqueous nutrient medium containing a metabolic inhibitor selected from the class consisting of water-soluble sulfonamides possessing antibacterial properties, and carbonyl reagents which inhibit glutamic acid decarboxylases, in an effective amount ranging from more than incidental impurities up to 8 g./liter of aqueous nutrient medium, until substantial activity is imparted to said medium by the production of N-demethylcelesticetin, (2) isolating the N-demethylcelesticetin from the fermentation medium, and (3) hydrolyzing the N-demethylcelesticetin to N-demethyldesalicetin.

8. A process for inhibiting the formation of N-alkylated compounds selected from the group consisting of lincomycin and celesticetin by microorganisms during a fermentation which comprises incorporating into the fermentation medium a water-soluble sulfonamide possessing antibacterial properties, in an effective amount ranging from more than incidental impurities up to 8 g./liter of aqueous nutrient medium.

9. N-demethylcelesticetin.

10. N-demethyldesalicetin.

References Cited by the Examiner

UNITED STATES PATENTS 2,851,463   9/1958   Hinman et al. _____ 260—210

LEWIS GOTTS, *Primary Examiner.*

JOHNNIE R. BROWN, *Assistant Examiner.*